United States Patent [19]
Carini et al.

[11] 3,876,462
[45] Apr. 8, 1975

[54] INSULATED CABLE WITH LAYER OF CONTROLLED PEEL STRENGTH

[75] Inventors: Francis F. Carini, Pittsburgh, Pa.; Steven Abbott, Vincennes, Ind.

[73] Assignee: Essex International, Fort Wayne, Ind.

[22] Filed: Oct. 15, 1973

[21] Appl. No.: 406,564

Related U.S. Application Data

[62] Division of Ser. No. 258,077, May 30, 1972, Pat. No. 3,787,255.

[52] U.S. Cl. ............... 117/216; 117/62.1; 117/218; 117/232; 156/51; 156/247; 174/110 PM; 174/120 SC; 174/120 SR; 260/686
[51] Int. Cl. ..................... B44d 1/18; H01b 13/14
[58] Field of Search ........ 117/218, 216, 232, 128.4, 117/62.1; 174/110 PM, 120 R, 120 SR, 120 SC

[56] References Cited
UNITED STATES PATENTS

| | | | |
|---|---|---|---|
| 3,479,446 | 11/1969 | Arnaudin et al. | 117/218 X |
| 3,541,228 | 11/1970 | Lombardi | 174/120 SC X |
| 3,586,569 | 6/1971 | Caiola | 156/308 |
| 3,624,054 | 11/1971 | Barton et al. | 260/79.3 R |
| 3,646,248 | 2/1972 | Ling et al. | 117/215 X |
| 3,684,821 | 8/1972 | Mayauchi et al. | 117/232 X |
| 3,705,257 | 12/1972 | Wade | 174/120 SC X |

*Primary Examiner*—Ralph Husack
*Attorney, Agent, or Firm*—Molinare, Allegretti, Newitt & Witcoff

[57] ABSTRACT

A high voltage electrical cable having at least two layers of cross-linked polyolefin insulation, i.e. polyethylene; the external layer being semi-conductive and strippable from the internal layer. Controlled strippability is accomplished by sulfonating the respective layers at their contact interface.

5 Claims, 1 Drawing Figure

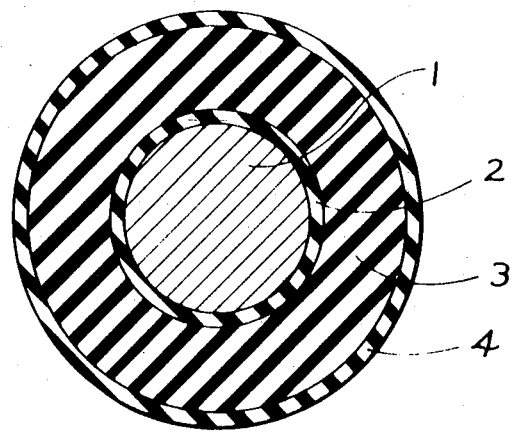

INSULATED CABLE WITH LAYER OF CONTROLLED PEEL STRENGTH

This is a division, of application Ser. No. 258,077, filed May 30, 1972, now U.S. Pat. No. 3,787,255 issued on Jan. 22, 1974.

BACKGROUND OF THE INVENTION

This invention relates to an improved high voltage cable having an insulating layer of vulcanized polyolefin and an outer semi-conductive layer of tough vulcanized polyolefin wherein the layers are strippably bonded.

In particular, this invention relates to an improved high voltage cable which has an inner semi-conductive shield of vulcanized polyolefin, an insulating layer of vulcanized polyolefin and an outer semi-conductor shield of tough vulcanized polyolefin which is readily strippable from said insulating layer to facilitate splicing said cable, yet is sufficiently bonded so that the semi-conductor layer does not separate during installation and conventional use. The outer extruded semi-conductor layer can be tandem extruded and simultaneously vulcanized with insulating layer.

It has been proposed (U.S. Pat. No. 3,541,228) to make a high voltage cable having strippable layers by using a chlorosulfonated polyethylene semi-conductor compound for the outer sheath. Such compounds, while strippable, do not have the desired toughness and heat resistance. These latter toughness and heat resistance properties are obtainable in a cross-linked or vulcanized semi-conductive polyolefin such as polyethylene or copolymers thereof but during vulcanization, the polyolefin layer cross links with the insulating layer beneath it and bonds so tenaciously that it is difficult to peel for splicing.

Attempts have been made to reduce adhesion between the two insulating layers. For example, a silicone coating has been placed on the outer surface of the inner insulating layer prior to laminating with the semi-conductive compound and vulcanizing. However, the presence of the silicone rendered the polyethylene surface too slippery to be practical. The outer cover stripped readily but separations from the inner layer occurred under normal conditions of use.

It is well known that the laminated layers on the conducting metal member of the cable must be bonded together with few, if any, air or voids between the layers. Consequently, any adhesive bond produced must be strong enough to prevent the formation of voids or air pockets during fabrication of the cable or upon use in service. For example, according to Specifications for Polyethylene and Crosslinked Polyethylene Insulated Shielded Power Cables Rated 2,001 to 35,000 Volts, published by the Association of Edison Illuminating Companies (AEIC No. 5-69), the teachings of which are specifically incorporated by reference herein, for thermoplastic polyethylene insulation there shall be no voids whose largest dimension exceeds 2.0 mils. For cross-linked thermosetting polyethylene, there shall be no voids whose largest dimension exceeds 5.0 mils. In addition, the maximum number voids shall not exceed a specified number of voids per cubic inch of insulation.

It has also been proposed to reduce the bond strength at the interface between the two layers by oxidizing the outer surface of the inner polyethylene layer. The oxidation was carried out by subjecting the surface to a corona discharge, a gas flame or to ozone gas to decompose the cross-linking agent in the polyethylene compound and to tie up reactive groups. The problem in producing a practical laminate by oxidation involved control. Excessive oxidation degraded the surface to such an extent that no bonding occurred. On the other hand, insufficient oxidation did not decompose the cross-linking agent, and the bond, after vulcanization, was too tenacious. To produce the desired degree of oxidation between these limits proved to be difficult.

SUMMARY OF THE INVENTION

An object of this invention is to provide an insulated electrical cable of the kind described having an inner vulcanized polyolefin insulation layer, and an outer semi-conductive vulcanized polyolefin layer, the bond between said layers permitting stripping of the outer layer for splicing, but being sufficiently tenacious to preclude separation except when stripping.

It is a further object of this invention to provide a method for strippingly bonding an outer vulcanizable semi-conductive polyolefin layer to an inner vulcanizable polyolefin insulating layer in a ready manner.

In preparing an insulated cable for splicing, it is important that, when the semi-conducting layer is stripped, no conductive material is left on the surface of the inner insulating layer. For example, if conductive carbon is left on the insulation, a ground potential may be created which will result in failure of the insulation at the splice. It is also important that the semi-conducting outer layer adhere to the insulating layer so that the voids or air spaces in the laminate which can result in electrical losses, are kept to a minimum as previously indicated.

In accordance with our invention, these objects are accomplished by sulfonating the surface of the vulcanized polyolefin insulating layer prior to enclosing it in the semi-conducting outer layer. By attaching sulfonate groups to the polyolefin molecule, diffusion of the cross-linking agent across the interface of the laminate is arrested or substantially retarded. This prevents the two layers locking together during vulcanization. It is suspected that because the sulfonate groups which form at the surface are relatively bulky they retard movement of the cross-linking agent across the interface. In a preferred form of the invention, sulfur trioxide gas in an inert carrier gas, such as, nitrogen, is passed over the surface of the unvulcanized polyolefin. The concentration of the sulfur trioxide, the temperature and time of exposure must be controlled to produce a strippable bond of desired strength without degrading the polyolefin surface by excessive sulfonation.

The desired strength of the bond can be controlled to amounts less that 16 pounds and preferably in the range of about 2-12 pounds measured, by peeling at an angle of 90° to the interface, a one-half inch width flat strip of the laminated semi-conductive polyolefin material. The exact method for determining stripping strength is described by AEIC No. 5-69 specification H.1.1. According to this specification, the semi-conducting jacket of a cable sample approximately 15 inches long is cut longitudinally and vertically down to the insulation. A second cut is then made in the same way at a ½ inch separation parallel to the first cut. Approximately two inches of the ½ inch strip of each end of the cable is removed by pulling it at a 90° angle away from the cable. A hole is punched at each end of the strip and the sample mounted horizontally on a scale hook through the holes. The stripping strength or tension is then determined by increasing the force on the strip at a 90° angle to the cable until the strip separates from the insulation at a speed of approximately ½ inch per second. As indicated, the required tension is preferably not less than 2 pounds nor more than 12 pounds although stripping strengths of 0–16 pounds are within the scope of the present invention.

Vulcanizable polyolefins suitable for use in accordance with the present invention include homopolymers and copolymers of the low molecular weight alpha olefins such as ethylene and propylene. Preferred are ethylene homopolymers, ethylene-propylene copolymers, chlorinated polyethylene and ethylene-vinyl acetate copolymers as commonly used for coating or jacketing electric cables. Preferred are thermoplastic polyethylene, commonly referred to in the art as "polyethylene" and cross-linked thermosetting polyethylene, commonly referred to in the art as "cross-linked polyethylene."

In preparing insulated cable in accordance with the invention, a metallic conductor such as a bundle of aluminum or copper wires preferably having an inner semi-conducting vulcanizable polyolefin or copolymer layer and subsequent extruded cover of vulcanizable polyolefin is passed continuously through a cylindrical chamber containing about 0.10 to 2 percent by volume sulfur trioxide in nitrogen. The length of the chamber and the rate at which the cable passes through the chamber is controlled so that the polyolefin insulating jacket is exposed for a period of between 0.1 and 30 seconds, preferably between 0.1 and 5 seconds. Particularly suitable reaction temperatures are within the range of about 16°C. to about 200°C. Satisfactory peelable bonds for polyethylene have been achieved after ½ second exposure to 1.5 percent sulfur trioxide in nitrogen at room temperature. At a concentration of 0.5 percent sulfur trioxide, the exposure time must be increased to 2.5 or 3.0 seconds. At concentrations of 2 percent sulfur trioxide, exposure must be limited to less than 25 seconds because charring of the polyethylene will begin after this amount of exposure. The reactant gas is prepared by metering quantities of sulfur trioxide from a pot heated above 44°C. into a metered quantity of nitrogen. The percentages of the gases are by volume. The gas chamber is equipped with an entrance port near one end and an exit port near the other. The sulfur trioxide flows thrugh the chamber at a rate to maintain substantially constant concentration of sulfur trioxide within the chamber. A seal is provided at the margins of entrance and exit openings of the chamber to prevent escape of gas around the jacketed conductor being treated.

The insulated conductor emerging from the reactor is then fed into an extruder where a semi-conductive layer of a polyolefin such as polyethylene is applied over the sulfur trioxide-treated surface. The laminated cable is then subjected to vulcanization such as a temperature of 170°C for times of about 20–40 minutes to cure the polyethylene and establish the peelable bond at the interface.

A preferred vulcanizable polyethylene for the insulating layer is compounded with dicumyl peroxide curing agent and sold as Polycure 521 by Cooke Color and Chemical Company, Hackettstown, N.J. When vulcanized, this material has a tensile strength of about 2500 psi and an elongation of 550 percent. Its heat distortion at 121°C. is 14 percent and the composition is characterized by good resistance to moisture and ozone. Other organic peroxides may be used in place of dicumyl peroxide as disclosed in U.S. Pat. No. 3,079,370. The peroxide may be present in an amount ranging from about 0.5 to 5.0 percent.

The external semi-conductive jacket may be a vulcanizable polyolefin such as polyethylene, as described, a chlorinated polyethylene or a copolymer of ethylene and an alpha olefinic material such as acrylic and methacrylic monomers (acrylic acid, acrylic esters, etc.) propylene, vinyl monomers, i.e. vinyl esters, vinyl halides such as vinyl chloride, or vinyl acetate and acrylonitrile. The copolymers preferably contain from 75–95 percent ethylene and the remainder being alpha olefinic material. To make such materials semi-conductive, about 30 to 40 parts of conducting carbon black are milled into the polymer or copolymer resin. A preferred semi-conductive vulcanizable copolymer is sold by Union Carbide Corportion of New York City under the designation HFDA-0580 Black 55.

The exact peel strength to be obtained for a given jacket or layer is dependent on the particular characteristics of the material such as the bulk mechanical properties; the physical and chemical nature of the surface and the nature of the interface that is formed. Each of these variables must be specified as closely as possible. For example, as the chemistry or roughness of a surface changes, different amounts of sulfonation are required to obtain a particular peel strength. Thus, for two separate cables, with no sulfonation, if the peel strength is 8 pounds, and 25 pounds respectively, then less sulfonation would be needed to lower the peel strength to 4 pounds for the "8 pound" cable than for the "25 pound" cable.

The exact degree of sulfonation or surface polarization of the polyethylene may be measured by determining the infrared absorption of the sulfonated polyethylene surface, the absorbence ratio being proportional to the degree of sulfonation. For polyethylene surfaces, this degree of sulfonation is calculated as the ratio of the absorption coefficient of the peak ∼1160 cm$^{-1}$ divided by the adsorption at ∼1460 cm$^{-1}$. The 1160 peak is mentioned in "Polyethylene Surfaces III" by Olsen and Osteraas as due to vibrations of the sulfonic acid. The 1460 peak is due to $CH_2$ and $CH_3$ deformation. In general, the larger the ratio, the more sulfonation has occurred. The absorbtion due to the $CH_2$ and $CH_3$ should be a normalizing factor. The preferred absorbence ratio is from 0.5 to 0.75 which results in a bond strength ranging from 6 to 10 pounds per one-half inch width strip. At an absorbence ratio of 0.25 to 0.35 the polyethylene layers bond so tenaciously after vulcanization that one cannot be peeled from the other. At an absorbence ratio of 2.0, the layers for certain applications may strip too easily and may result in undesirable air pockets and separations.

For the described Polycure 521 vulcanizable polyethylene, at 27°C a contact time of about 4 seconds with a 1% $SO_3$ in nitrogen mixture gave a sulfonation ratio of between 0.5 and 1.0.

Peel strength may also be correlated with the wetting angle of a drop of water on the sulfonated surface. The degree of wetting varies with the polar nature of the surface, the smaller the acute angle, the more polar the surface. We have found that a sulfonated polyethylene surface having a wetting angle of from 50°–70° provides the desirable 2 to 12 pounds peel strength.

The cable of the invention is shown in the attached drawing. Copper conductor 1 is enclosed in an internal layer of vulcanizable semi-conductive copolymer ethylene 2, and in an external layer of vulcanized polyethylene 3 which, in turn, is bonded by means of the procedure described herein to an external layer of vulcanizable semiconductive copolymer ethylene 4. The layer 4 may be readily stripped from the insulation 3 without leaving any conductive carbon or other residue. Thus, the cable of the invention is readily suited for splicing or terminating.

It is to be realized that the cable illustrated merely illustrates a preferred three-layer cable configuration and cables cntaining two layers as well as cables containing more than three layers are within the scope of the present invention.

In place of gaseous sulfur trioxide, the sulfonation of the invention may be carried out by exposing the polyethylene surface to fuming sulfuric acid or sulfonyl chloride.

What is claimed is:

1. A high voltage insulated electric cable having at least two polymer layers thereon comprising in combination:
   a conductor:
   an insulating layer comprising a cross-linked polyolefin surrounding the conductor; and
   a semi-conductive, external layer of cross-linked, semiconductive polyolefin surrounding the conductor and strippably bonded to said insulating layer,
   the outer surface of said insulating layer being sulfonated to the extent required to produce cohesive forces between said insulating layer and semi-conductive layer within the range permitting stripping said semi-conductive layer from said insulating layer when splicing or terminating said cable while remaining securely adhered in normal use.

2. The cable of claim 1 wherein said range of cohesive force is between 2 and 12 pounds per one-half inch width strip.

3. The cable of claim 1 in which said range of cohesive force is 0–16 pounds per one-half inch width strip.

4. The cable of claim 1 wherein said insulating layer is polyethylene cross-linked with dicumyl peroxide and said semiconductive layer is a polymer of ethylene and an alpha olefin containing conductive carbon black.

5. The cable of claim 1 wherein an internal layer of cross-linked, semi-conductive polyethylene is disposed between the conductor and the insulating layer.

* * * * *